United States Patent [19]
Norman

[11] 3,775,111

[45] Nov. 27, 1973

[54] STABILIZED BLEACHED SILVER HALIDE HOLOGRAMS

[75] Inventor: Scott L. Norman, Des Plaines, Ill.

[73] Assignee: GTE Automatic Electric Laboratories Incorporated, Northlake, Ill.

[22] Filed: Oct. 4, 1971

[21] Appl. No.: 186,466

[52] U.S. Cl.................. 96/27 H, 96/60 R, 96/61 R
[51] Int. Cl. ....... G03c 5/04, G03c 5/32, G03c 5/38
[58] Field of Search .................................... 96/27 H

[56] References Cited
OTHER PUBLICATIONS

Applied Optics, Mar. 1970, Vol. 9, No. 3, pp. 713,715–719 Holographic Dielectric Grating: Theory & Practice.

P. Glafkides, Photographic Chemistry (Fountain Press, London, 1960) Vol. 2, Chap. 42, pp. 920–934.

Mees, The Theory of Photographic Process pp. 258–261.

*Primary Examiner*—Norman G. Torchin
*Assistant Examiner*—M. F. Kelley
*Attorney*—K. Mullerheim et al. and Theodore C. Jay, Jr.

[57] ABSTRACT

Silver halide phase holograms stabilized to radiation at selected wavelengths are prepared by exposure of silver halide photographic emulsion plates to laser radiation at preselected wavelengths to form a holographic pattern of metallic silver in said emulsion, developing said photographic emulsion plate, converting residual silver to silver halide by conventional bleaching processes, and dyeing the bleached hologram with an organic dye to desensitize the silver halide against decomposition by radiation at the preselected wavelengths without substantial absorbtion of the radiation at that wavelength. Stabilization of bleached silver halide holograms to argon ion laser radiation at 4,880 and 5,145 angstroms is disclosed.

7 Claims, No Drawings

STABILIZED BLEACHED SILVER HALIDE HOLOGRAMS

BACKGROUND OF THE INVENTION

1. Field of the Invention

This invention relates to processes for preparing stabilized silver halide phase holograms for photographic plates.

2. Description of the Prior Art

Phase holograms prepared by conversion of the metallic silver of a conventionally processed photographic plate to a transparent compound which has a refractive index which differs from that of the gelatin matrix are known. These holograms are prepared by exposure of a photographic plate to a source of monochromatic light, i.e., a coherent light source under hologram forming conditions. More particularly, a coherent or monochromatic light beam is divided and one portion, the reference beam, is directed to the recording medium or photographic plate and the other to the object to be recorded and the reflection or transmission from the object in the form of a so-called object beam is also directed to the recording medium. The resulting interference pattern of the object beam and reference beam is recorded in the recording medium. The photographic plate when developed by conventional means is termed a hologram and when viewed by transmitted or reflected coherent light of the same wavelength directed to the hologram at the same angularity as the reference beam in the hologram formation has the capacity to duplicate and reproduce the original object beam. The silver halide phase hologram differs only in the sense that in a typical photographic negative hologram the silver particles forming the grating resulting from exposure are opaque. In the phase hologram the silver metal is converted to a silver salt which, although transparent to light, has an index of refraction that differs from that of the emulsion. The grating principal in the formation of the hologram, however, remains the same.

Phase holograms where bleached photographic plates are employed are those where the metallic silver resulting from exposure and remaining in the negative after development is converted to a silver halide, such as bromide. Of course, the silver halide salts produced by bleaching a hologram negative, while altered by the photographic exposure, development and bleaching process and thereby made less sensitive to light than the original salt of the emulsion, are still subject to photo decomposition, especially when exposed to high intensity laser beams. This photo decomposition or reconversion of the silver halide to silver metal results in print-out darkening of the plate or transparency and with that print out, limits the life of the phase hologram since the silver metal is opaque and blocks the laser beam rather than transmitting and refracting it as originally intended.

The photographic art discloses techniques for stabilizing exposed photographic emulsions by the employment of desensitizing dyes. These dyes, applied to the emulsion prior to development, coat the silver halide granules and act to retard the photo decomposition of the silver halide by light but do not impede the development process. These predevelopment desensitizers in effect are believed to prevent recombination of photoelectrons liberated by incident radiation and silver ions from the unreduced silver halide remaining in the emulsion to form metallic silver.

The photographic art also teaches that certain dyes may be employed as sensitizers or more particularly to increase the sensitivity of silver halide emulsions to long-wavelength radiation in the red regions where silver halide emulsions are unresponsive. The prior art also describes stabilization of photographic plate holograms by converting silver to a silver salt which is more resistant to photo decomposition than silver halide. Such chemical stabilization is reported by McMahon and Maloney, Applied Optics, 9, 1363 (1970).

It has now been found, however, that the problems associated with the lack of stability of silver halide phase holograms and consequent print-out darkening may be substantially reduced by the use of selected organic dyes which decrease the sensitivity of silver halide phase holograms to particular preselected wavelengths.

SUMMARY OF THE INVENTION

This invention relates to methods for preparing bleached silver halide phase holograms which are stabilized against print-out darkening on exposure to laser radiant energy of preselected wavelengths. Broadly, the process comprises the steps of:

a. exposing a silver halide photographic plate to laser radiation of preselected wavelength to form a latent holographic pattern of metallic silver in the photographic emulsion;

b. developing the exposed photographic plate to form a negative;

c. converting the metallic silver in the negative to a silver halide to form a bleached hologram; and d. dyeing the bleached hologram with an organic dye which exhibits substantial transmission of the laser radiation at the preselected wavelength and concomitantly reduces the sensitivity of the silver halide in the bleached hologram to photolytic decomposition to metallic silver by laser radiation at the said preselected wavelength.

Broadly, the holograms of the present invention are prepared using conventional photographic plates or films in which the emulsion contains a particulate granular silver halide in a gelatin matrix. By silver halide it is intended to include silver chloride, silver bromide, or other halides used singly as well as mixed halides such as silver chloride-bromide. While the term "plate" is used, it is intended to cover both photographic glass plates, sheet film or photographic emulsions formed on other substrates which are optically transparent to the visible spectrum laser radiation of the wavelength that is employed. Photographic plates such as Eastman Kodak Company's Kodak 649F may be considered exemplary.

The latent hologram formed by exposure of the film is developed by conventional photographic processing techniques to form a negative. The developers employed may be those customarily used in processing the particular film used. Kodak D-19 (Eastman Kodak Co.), for example, may be used with the 649F type plate. The stop baths, fixers, and the like are all of conventional types as are employed in ordinary photographic processing.

The bleaching agent employed may be any oxidizing salt which has the capacity to convert the metallic silver in the negative to a silver halide. Thus, for example, one may employ metallic halides such as copper bromide, copper chloride or the like to form a silver salt of the corresponding halide. While it is possible to use halides such as chloride, bromide or iodide in this bleaching procedure, it should be pointed out that the bromide is the most preferred from the point of view of stability and refractive index characteristics. The bleaching should be carried out sufficiently long to insure that the bleached hologram will contain a minimum of residual metallic silver and depending upon the type of plate employed the processing time will vary to achieve that end result. Usually from 5 to 20 minutes is sufficient for bleaching.

Since many photographic films or plates contain dye sensitizers incorporated in the emulsion for the purposes of providing a broader spectrum of sensitivity to light within the visible spectrum range, it is desirable to insure removal of these dyes by processing with an oxidizing agent such as potassium permanganate or the like.

The dyes employed in this process are applied to the bleached hologram after the oxidizing agent bath step if such is employed. The dyes are preferably incorporated into a methanol solution and the plate placed in the bath for a period of time sufficient to absorb the desensitizing amount of dye required. Other short chain alcohols may also be used such as ethanol or propanol. Most of the organic dyes of interest appear to be soluble in alcohols. A further rinse after the dyeing step may include alcohol-water mixtures to remove excess dye from the surface of the plate as well as excess moisture followed by air drying.

Generally, the concentration of dye employed in the bath is variable. However, it has been found that higher concentrations do not necessarily provide an extension in the lifetime of the hologram. Thus, for example, a dye bath having a concentration of certain dyes in the range of one part per 1,000 was found to decrease the life of the hologram while a lower concentration of one part per 10,000 produced about a five-fold extension of useful life (as compared with bleached holograms which have not been dyed).

In this connection it should be understood that the stabilization of the hologram is determined by the time required for the specular transmission at normal incidence for a given wavelength of light to drop to 75 percent of its initial value as a result of print-out darkening. Print-out darkening, of course, refers to the decomposition of the silver halide in the phase hologram to produce metallic silver particles. This time period which will sometimes hereinafter be denoted by T(75 percent) is the figure of merit by which the stability of the plates processed in accordance with the process of the present invention were measured.

The lifetime extension factors sometimes referred to herein are given in multiples or decimal fractions of the unstabilized hologram. Thus, the time required for a dyed hologram to drop to the T(75 percent) value over the time required for the undyed hologram will give a ratio figure. That is, a lifetime extension factor of less than unity means that the hologram was sensitized and greater than unity means that the hologram was stabilized against print-out darkening.

The life test conditions to determine this value were obtained by illuminating the center of the hologram under test with 4,880 or 5,145 angstrom unit beams having a diameter of 2 mm., a power of 100/mW (a power density of 3.2 W/cm$^2$), monitoring the specular transmission for normal incidence illumination and determining the time required for specular transmittance to drop to 75 percent of its initial value.

It should be understood that while the tests were conducted using argon ion laser radiation of 4,880 and 5,145 angstroms, the stability and selection of dyes will be in the context of any pre-selected wavelength of laser beam radiation that is employed in forming the hologram. Argon ion lasers are used for exemplification since they have adequate power and are generally available. With reference to the convention of designating wavelength, it is customary to employ nanometers (nm) in lieu of angstrom units. Since these are rounded off to three significant figures, it should be understood that 488 and 515 nm refers to wavelengths of 4,880 and 5,145 angstroms.

By the term organic "dyes" it should be understood that it is intended to include materials which are not conventionally included in that group classification, such as, for example, picric acid.

The dyes used in the process of the present invention are materials which have two main requirements which bear on their capacity to function as a stabilizer for silver halide phase holograms. These requirements are that the dye exhibit minimal absorption of incident light energy at the wavelength selected to form the hologram and at the same time exhibit a desensitizing action on the silver halide. Obviously, since all dyes or for that matter all organic compounds, absorb some light energy at almost all portions of the visible spectrum, the criterion is that absorption of the particular wavelength employed in forming the hologram and recovering the information stored therein be at a minimum. By "minimum" it is intended that the absorption be essentially of a relatively low magnitude so as not to interfere with the information recovery process, i.e., reproduction of the object wave from the hologram by illumination with the laser beam.

The organic dye compounds employed herein may be classified generally as pre-development "densensitizers" and long wave "sensitizers." These descriptions derived from the ordinary photographic processing art are, however, inappropriate in the context of the bleached hologram or silver halide phase hologram art. Thus, while some substances are known as pre-development desensitizers, it has been found that under high intensity laser radiation conditions which are sufficient to produce print-out darkening, some of these compounds sensitize the silver halide and induce decomposition of silver. While the literature has not reported any correlation of absorption spectrum and desensitizing ability, it has been determined that desensitizing dyes (used in an ordinary sense) which are yellow, blue or blue-green produce the best results. Likewise, with "sensitizers," it has been found that under laser illumination the sensitizers may be desensitizers in the shorter wavelengths.

Generally, the long wavelength sensitizer dyes found suitable may be categorized as broadly having a characteristic structure of:

A. the amidinium-ion system with a characteristic structure:

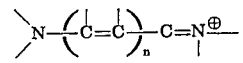

B. the carboxyl-ion system with a characteristic structure:

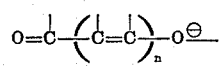

C. the amidic system with a characteristic structure:

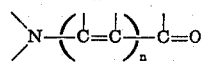

Most preferred are those where $n$ is greater than 1, preferably between 1 and 3.

The dyes may also be described as having two polar atoms, nitrogen (N) or oxygen (O) which are capable of existing in two adjacent states of co-valency, joined by alternating single and double bonds. Nitrogen or oxygen atoms in the above structural units may be a part of a heterocyclic structure such as quinoline, thiazole, thiazoline, pyridine, benzoxazole, benzothiazole, benzosilenozole, benzimidazole, indolenine, napthy-(2,1)-oxazole, naptho-(1,2)-thiazole, napththo-(2,3)-thiazole. The dye substitutions can be symmetrical or unsymmetrical with reference to the characteristic structures. The quaternary ammonium type compounds (Item (A) above) can be formed with a variety of alkyl halides, esters or the like such as ethyl iodide, ethyl chloride, methyl chloride, toluene sulfuric acid esters or the like.

The pre-development desensitizing class of dyes are organic oxidizing agents which are strongly absorbed to the surface of silver halide particles. Generally, azines such as phenozine derivatives, tetrazines, quinoxalines, nitro compounds such as picric acid, aurantia and naphthol yellow, azo dyes such as chrysoidine, and thraquinine derivatives, di and triphenylmethane derivatives such as brilliant green, methyl violet, crystal violet, fuchia, Victoria blue, and auramine, and styryl derivatives. Of this group the nitro compounds are preferred and picric acid is the most preferred.

The concentration of the dyes employed in the bath may vary. Thus, concentrations from as high as 1 part per 100 to as low as about 1 part per 100,000 have been used. It should be understood that in some cases a higher concentration of dye produces sensitization and a low concentration, desensitization.

DESCRIPTION OF THE PREFERRED EMBODIMENTS

The following examples will illustrate the preparation of stabilized bleached holograms in accordance with the process of the present invention.

PROCEDURE

Test holograms are prepared by exposure of photographic film plates to argon ion laser light of either 4,880 or 5,145 angstroms. The specifications are:

Beam diameter: — 6 mm.
Power: — 1.80 m W/Beam
Exposure: — 2.5 mS
Pre-bleaching
Optical Density — 2.4
Polarization: — S The exposed photographic plate was processed using the following materials in the sequence and times indicated in Table I following. All times are for 20°C. processing for Kodak 649F plates and may, of course, be adjusted to meet the requirements of other processing temperatures or other types or photographic plates.

TABLE I
PROCESSING SEQUENCE

All times are for 20°C processing of Kodak 649F

| | | Min. |
|---|---|---|
| Preharden* | Kodak SH-5 | 3 |
| Wash | | 3 |
| Develop* | Kodak D-19 | 6 |
| Shortstop* | Indicating Stop Bath | 0.5 |
| Fix | Rapid Fixer w/Hardener | 4 |
| Wash | | 10 |
| Bleach* | 5% $CuBr_2$ in Water | 9 |
| Rinse | | 0.5 |
| Desensitize* | Acid Permanganate Bath** | 2 |
| Wash | | 10 |
| Alcohol Baths* | Methanol with or without Dye | 15 |
| | 90% Isopropanol–10% $H_2O$ | 1 |
| Air Dry | | |

* Constant agitation
** Part A
| Part A | | Part B | |
|---|---|---|---|
| $KMnO_4$ | 5 gm | $H_2SO_4$ (conc.) | 10 ml |
| $H_2O$ | 1 liter | KBr | 40 gm |
| | | $H_2O$ 1 liter | |

Mix A:B=1:10 just before use.

The following Table II will show the results obtained in specific examples of holograms prepared at 515 nm following the procedure outlined above and employing a variety of dyes and tested at 515 or 488 nm. Spot checks were made by exposure at 488 nm and lift tested at both 488 and 515 nm. The lifetime extension factors are as described above, with a factor of less than one indicating sensitizing of the hologram with the particular dye at the indicated bath concentration. Factors of greater than one show lifetimes over the undyed bleached hologram (to the T(75 percent) level) by the indicated multiple.

TABLE II
LONG WAVELENGTH SENSITIZER DYES

| Example | Dye and Concentration the Bath (in parts) | Lifetime Extension Factors at Indicated Wavelength (Argon ion laser) | |
|---|---|---|---|
| | | 515 nm (green) | 488 nm (blue) |
| 1 | Cryptocyanine 1,1'-diethyl-4,4'-carbocyanine iodide | | |
| | $10^{-4}$ | 2.6 | 5.2 |
| | $10^{-5}$ | 0.77 | 1.2 |
| | $10^{-3}$ | 1.1 | 0.27 |
| 1 | (3,3'-diethylthiadi-carbocyanine iodide) | | |
| | $10^{-4}$ | 0.38 | 0.35 |
| | $3 \times 10^{-4}$ | 1.1 | 0.62 |
| | $4 \times 10^{-4}$ | 6.0 | 1.0 |
| | $5 \times 10^{-4}$ | 9.5 | 0.62 |
| | $6 \times 10^{-4}$ | 13.7 | 1.9 |
| | $7 \times 10^{-4}$ | 15.6 | 0.73 |
| | $10^{-3}$ | 26, but low transmissivity | 2.0 |
| 3 | Pinacyanol 1,1'-diethyl-2,2'-carbocyanine iodide | | |
| | $10^{-4}$ | 12.2 | 1.8 |
| 4 | (1,1'-diethyl-2-2'-dicarbocyanine iodide) | | |
| | $10^{-4}$ | 3.33 | 3.06 |
| | $5.5 \times 10^{-4}$ | 7.8 | 5.5 |
| 5 | (6,6'-diethoxy-1,1'-diethyl-2,4'-carbocyanine iodide) Dicyanine A | | |
| | $10^{-4}$ | 1.0 | 0.7 |
| | $5 \times 10^{-4}$ | 4.3 | 1.5 |
| | $10^{-3}$ | 2.2 | 2.5 |

The above are long wavelength sensitizers. Below are the predevelopment desensitizers:

PREDEVELOPMENT DESENSITIZER DYES

| Example | Dye and Concentrations the Bath (in parts) | Lifetime Extension Factors at Indicated Wavelength (Argon ion laser) | |
|---|---|---|---|
| | | 515 nm. (green) | 488 nm (blue) |
| 6 | Picric Acid (2,4,6-trinitrophenol) | | |
| | $10^{-3}$ | 1.4 | 1.06 |
| | $3 \times 10^{-3}$ | 4.45 | 0.27 |
| | $6 \times 10^{-3}$ | 11.1 | 0.13 |
| | $10^{-2}$ | 33.3 | 0.13 |
| | $2 \times 10^{-2}$ | 40 | 0.13 |
| 7 | (6-ethoxy-1-methyl-2-(m-nitrostyryl)-quinoline methosulfate Pinakryptol Yellow | | |
| | $10^{-3}$ | 1.44 | 2.14 |
| | $10^{-2}$ | 1.31 | 1.70 |
| 8 | Pinakryptol Green | | |
| | $10^{-4}$ | 4.50 | 1.73 |
| | $10^{-3}$ | 3.0 | 0.87 |
| 9 | Nile Blue A | | |
| | $10^{-4}$ | 1.30 | 0.67 |
| | $10^{-3}$ | 1.10 | 0.40 |
| 10 | Thymol Blue | | |
| | $10^{-4}$ | 1.50 | |
| | $10^{-3}$ | 60 fairly low transmissivity | 67 |
| 11 | Safranin Light Green | | |
| | $10^{-4}$ | 1.70 | 2.0 |
| | $10^{-3}$ | — | 0.87 |

Some indication of the lifetimes of the dyed holograms can be observed by reference to the following Table III. In this table the actual lifetimes in seconds of dyed holograms to T(75 percent) prepared in one of the preceding examples at the concentrations and wavelengths are indicated. The lifetime of the control of the undyed bleached hologram is indicated first for each group of data.

TABLE III

LIFETIMES — 488 nm (4880 Angstroms)

| Example (from Table II) | Concentration* | Lifetime in Seconds |
|---|---|---|
| CONTROL | 0 | 105 |
| 1 | 0.001 | 29 |
| 1 | 0.0001 | 550 |
| 1 | 0.00001 | 125 |
| CONTROL | 0 | 80 |
| 3 | 0.0001 | 145 |
| 4 | 0.0001 | 245 |

LIFETIMES — 515 nm (5145 Angstroms)

| CONTROL | 0 | 90 |
|---|---|---|
| 3 | 0.0001 | 1100 |
| 4 | 0.0001 | 300 |
| CONTROL | 0 | 90 |
| 7 | 0.01 | 3500 |
| 7 | 0.006 | 1000 |
| 7 | 0.003 | 400 |

* Parts by Weight

From the foregoing data it will be observed that the results obtained are variable depending on the context in which a particular dye is employed, i.e., particular wavelength used in forming the hologram and to recover the data from the hologram. Thus, dyes which are considered to be long wave sensitizers in conventional photographic situations, are found to be desensitizers for certain short wavelengths. Moreover, dyes which act as desensitizers for radiation at 515 nm may be sensitizers at 488 nm and vice versa. The concentration moreover plays a part in that in some cases an increase in concentration will result in sensitizing the hologram and a decrease in concentration will result in desensitization.

Accordingly, it is to be understood that the selection of the dye employed is a function of the particular wavelength employed in formation of the hologram. It should be also understood that the present invention includes the concept of recording and recovery of information in a holographic process where a particular preselected wavelength of laser radiation is employed. Thus, while the examples preceding are specific to argon ion laser radiation, particularly at 488 and 515 nm, the process is applicable to other wavelengths employing other laser systems.

On one particular aspect, it should be observed that nitro compounds, especially polynitro compounds such as picric acid, produced outstanding extensions at 515 nm (5145 A). Other aromatic nitro compounds, such as trinitro toluene, trinitrobenzene, dinitrophenol, p-nitrophenol, 2-hydroxy-2,5-dinitrotoluene, m-nitrophenol, 2,4-dimethyldinitrobenzene and the like are in a class that has utility in this process. Generally, aromatic nitro compounds may be used for this purpose if they meet the criteria, i.e., good transmission of the particular wavelength and also desensitization or stabilization at that wavelength.

In respect to transmission of light at the preselected wavelength, it should be understood that a transmission of at least 50 percent is desired. It should be understood that the preselected wavelength should preferably be within the major visible-spectrum transmission peak of the dye. Generally, for stability a lifetime factor of at least two and preferably four or more is preferred.

I claim:

1. A process for preparing a stabilized bleached silver halide hologram which comprises:
   a. exposing a silver halide photographic plate to laser radiation having a wavelength of 515 nm to form a holographic pattern of metallic silver;
   b. developing and fixing said exposed plate to form a negative of said hologram;
   c. converting metallic silver in said negative to silver halide to form a bleached phase hologram; and
   d. dyeing the bleached hologram in a dye bath containing picric acid at a concentration of from $10^{-3}$ to $10^{-2}$ parts to permit both desensitization to and transmittance of radiation at a wavelength of about 515 nm.

2. A process according to claim 1 wherein silver halide formed in step (c) is silver bromide.

3. A process according to claim 1 which also includes the step of treating the bleached hologram with an oxidizing agent bath.

4. A process according to claim 1 wherein the negative is treated with cupric bromide to form a silver bromide bleached hologram.

5. A process according to claim 1 wherein the picric acid is applied from a methanol solution bath having a picric acid concentration of at least 3 parts per 10,000.

6. A process for desensitizing bleached silver halide holograms formed from silver halide photographic plates by exposure to holographic radiation having a wavelength of 515 nm which comprises dyeing the bleached plate with a dye bath containing picric acid at a concentration of $10^{-2}$ to $10^{-3}$ parts to desensitize the silver halide in said hologram to radiation of the same wavelength.

7. A desensitized silver halide phase hologram comprising a photographic plate having a transparent substrate, a gelatin emulsion on a surface of said substrate and silver halide particles distributed throughout said emulsion in a holographic pattern and picric acid adsorbed on said silver halide particles which dye transmits laser radiation at a wavelength of 515 nm and concomitantly retards photolytic degradation of said silver halide to metallic silver by radiation of said wavelength.

* * * * *